US012567434B2

(12) United States Patent
Olsson et al.

(10) Patent No.: US 12,567,434 B2
(45) Date of Patent: Mar. 3, 2026

(54) AUDIO SYSTEM, AUDIO DEVICE, AND METHOD FOR SPEAKER EXTRACTION

(71) Applicant: GN Audio A/S, Ballerup (DK)

(72) Inventors: Rasmus Kongsgaard Olsson, Ballerup (DK); Clément Laroche, Ballerup (DK)

(73) Assignee: GN AUDIO A/S, Ballerup (DK)

(*) Notice: Subject to any disclaimer, the term of this patent is extended or adjusted under 35 U.S.C. 154(b) by 246 days.

(21) Appl. No.: 18/062,778

(22) Filed: Dec. 7, 2022

(65) Prior Publication Data

US 2023/0206941 A1 Jun. 29, 2023

(30) Foreign Application Priority Data

Dec. 23, 2021 (EP) .................................... 21217565

(51) Int. Cl.
*G10L 25/78* (2013.01)
*G10L 21/0208* (2013.01)
*G10L 25/30* (2013.01)

(52) U.S. Cl.
CPC .......... *G10L 25/78* (2013.01); *G10L 21/0208* (2013.01); *G10L 25/30* (2013.01); *G10L 2021/02082* (2013.01)

(58) Field of Classification Search
CPC ..... G10L 25/78; G10L 21/0208; G10L 25/30; G10L 2021/02082; G10L 21/0272; G10L 2021/02087; G10L 21/0216; G10L 2021/02163; G06N 20/00
USPC .......................................................... 704/200
See application file for complete search history.

(56) References Cited

U.S. PATENT DOCUMENTS

| | | | | |
|---|---|---|---|---|
| 6,032,072 A * | 2/2000 | Greenwald | A61B 5/398 600/397 |
| 6,449,593 B1 * | 9/2002 | Valve | H04R 3/005 704/233 |
| 7,016,488 B2 * | 3/2006 | He | H04B 3/23 379/406.01 |
| 8,160,273 B2 * | 4/2012 | Visser | G10L 21/0272 381/94.7 |
| 8,620,672 B2 * | 12/2013 | Visser | H04R 3/005 704/226 |
| 8,898,056 B2 * | 11/2014 | Chan | G10L 21/0272 704/205 |
| 9,094,771 B2 * | 7/2015 | Tsingos | H04S 7/302 |
| 10,735,887 B1 * | 8/2020 | McElveen | H04R 1/406 |

(Continued)

OTHER PUBLICATIONS

The extended European search report issued in European Application No. 21217565.7, dated Jun. 10, 2022.

(Continued)

*Primary Examiner* — Thuykhanh Le
(74) *Attorney, Agent, or Firm* — HSML P.C.

(57) ABSTRACT

A method for speech extraction in an audio device is disclosed. The method comprises obtaining a microphone input signal from one or more microphones including a first microphone. The method comprises applying an extraction model to the microphone input signal for provision of an output. The method comprises extracting a near speaker component in the microphone input signal according to the output of the extraction model being a machine-learning model for provision of a speaker output. The method comprises outputting the speaker output.

10 Claims, 5 Drawing Sheets

(56) References Cited

U.S. PATENT DOCUMENTS

| | | | | |
|---|---|---|---|---|
| 11,081,788 | B1 * | 8/2021 | Hahn, III | H04B 17/102 |
| 11,201,643 | B1 * | 12/2021 | Aljohani | H04B 7/0408 |
| 11,620,983 | B2 * | 4/2023 | Zhang | G10L 15/02 |
| | | | | 704/232 |
| 2002/0048376 | A1 * | 4/2002 | Ukita | H04R 1/406 |
| | | | | 348/E7.083 |
| 2003/0123674 | A1 * | 7/2003 | Boland | H04M 9/082 |
| | | | | 379/406.01 |
| 2004/0252652 | A1 * | 12/2004 | Berestesky | H04B 3/23 |
| | | | | 370/286 |
| 2005/0060142 | A1 | 3/2005 | Visser et al. | |
| 2007/0021958 | A1 | 1/2007 | Visser et al. | |
| 2008/0208538 | A1 * | 8/2008 | Visser | G10L 21/0272 |
| | | | | 704/226 |
| 2009/0175466 | A1 * | 7/2009 | Elko | H04R 3/04 |
| | | | | 381/94.1 |
| 2009/0299742 | A1 * | 12/2009 | Toman | G10L 21/0208 |
| | | | | 704/E15.039 |
| 2010/0324890 | A1 * | 12/2010 | Adeney | G10L 25/69 |
| | | | | 704/201 |
| 2011/0038489 | A1 * | 2/2011 | Visser | G10L 21/0216 |
| | | | | 381/92 |
| 2011/0066428 | A1 * | 3/2011 | Yang | A61M 5/168 |
| | | | | 704/E19.001 |
| 2011/0264447 | A1 * | 10/2011 | Visser | G10L 25/78 |
| | | | | 704/208 |
| 2012/0016669 | A1 * | 1/2012 | Endo | G10L 21/038 |
| | | | | 704/205 |
| 2012/0114126 | A1 * | 5/2012 | Thiergart | G10L 21/0272 |
| | | | | 381/17 |
| 2012/0237037 | A1 * | 9/2012 | Ninan | H04S 7/304 |
| | | | | 381/17 |
| 2013/0275128 | A1 * | 10/2013 | Claussen | G10L 25/78 |
| | | | | 704/233 |
| 2013/0317783 | A1 * | 11/2013 | Tennant | G10L 21/0208 |
| | | | | 702/191 |
| 2014/0064476 | A1 * | 3/2014 | Mani | H04M 3/002 |
| | | | | 379/406.08 |
| 2014/0278445 | A1 * | 9/2014 | Eddington, Jr. | G10L 15/20 |
| | | | | 704/275 |
| 2014/0337021 | A1 * | 11/2014 | Kim | G10L 25/81 |
| | | | | 704/228 |
| 2015/0112671 | A1 * | 4/2015 | Johnston | H04R 3/005 |
| | | | | 704/233 |
| 2015/0235125 | A1 * | 8/2015 | Krishnan | G06N 3/049 |
| | | | | 706/22 |
| 2016/0193732 | A1 * | 7/2016 | Breazeal | B25J 11/0005 |
| | | | | 700/258 |
| 2017/0100550 | A1 * | 4/2017 | Van De Laar | A61B 5/087 |
| 2018/0053512 | A1 * | 2/2018 | Cilingir | G10L 21/0208 |
| 2018/0197557 | A1 * | 7/2018 | Guo | G10L 15/02 |
| 2018/0220007 | A1 * | 8/2018 | Sun | G10L 21/0208 |
| 2019/0086508 | A1 * | 3/2019 | Isberg | H04W 64/006 |
| 2019/0096419 | A1 * | 3/2019 | Giacobello | H04M 9/082 |
| 2019/0137045 | A1 * | 5/2019 | Jalilian | G01M 3/38 |
| 2019/0172480 | A1 * | 6/2019 | Kaskari | G10L 25/78 |
| 2019/0228791 | A1 * | 7/2019 | Sun | G10L 25/78 |
| 2019/0362711 | A1 * | 11/2019 | Nosrati | G06F 17/18 |
| 2019/0394598 | A1 * | 12/2019 | Moore | H04R 3/12 |
| 2020/0005806 | A1 * | 1/2020 | Seo | H04M 9/082 |
| 2020/0075033 | A1 | 3/2020 | Hijazi et al. | |
| 2020/0105287 | A1 * | 4/2020 | Chang | G10L 19/028 |
| 2020/0162274 | A1 * | 5/2020 | Lyer | H04L 65/4015 |
| 2020/0221244 | A1 * | 7/2020 | Peeler | G10L 21/0356 |
| 2020/0312345 | A1 * | 10/2020 | Fazeli | H04M 9/082 |
| 2020/0312346 | A1 * | 10/2020 | Fazeli | G06N 3/0475 |
| 2020/0388299 | A1 * | 12/2020 | Kawai | G10L 21/0272 |
| 2021/0006900 | A1 * | 1/2021 | Ohashi | G10K 11/17817 |
| 2021/0042796 | A1 * | 2/2021 | Khoury | G06Q 30/0272 |
| 2021/0043198 | A1 * | 2/2021 | Tanaka | B60R 11/0247 |
| 2021/0116532 | A1 * | 4/2021 | Yang | H04W 4/023 |
| 2021/0204059 | A1 * | 7/2021 | Trestain | H04R 3/005 |
| 2022/0036903 | A1 * | 2/2022 | Cilingir | G10L 17/20 |
| 2022/0086592 | A1 * | 3/2022 | McElveen | H04S 7/307 |
| 2022/0115021 | A1 * | 4/2022 | Ukai | G06V 40/174 |
| 2022/0201421 | A1 * | 6/2022 | McElveen | H04R 1/406 |
| 2022/0279305 | A1 * | 9/2022 | Sheaffer | H04M 1/6066 |
| 2022/0301582 | A1 * | 9/2022 | Wang | G10L 21/0216 |
| 2022/0319498 | A1 * | 10/2022 | Caroselli, Jr. | G10L 15/05 |
| 2022/0345845 | A1 * | 10/2022 | Tsingos | H04R 5/04 |
| 2023/0005488 | A1 * | 1/2023 | Hiroe | H04R 3/005 |
| 2023/0029048 | A1 * | 1/2023 | Hahn, III | H04B 17/0085 |
| 2023/0077621 | A1 * | 3/2023 | Ono | G10L 21/028 |
| | | | | 381/56 |
| 2023/0162757 | A1 * | 5/2023 | Zheng | H04R 1/406 |
| | | | | 704/233 |
| 2023/0190140 | A1 * | 6/2023 | Tiron | A61B 5/746 |
| | | | | 600/534 |
| 2023/0403506 | A1 * | 12/2023 | Zhu | H04M 9/08 |
| 2024/0005942 | A1 * | 1/2024 | Liu | G06N 3/0475 |
| 2024/0085935 | A1 * | 3/2024 | Yu | G06N 3/045 |
| 2024/0195916 | A1 * | 6/2024 | Schiøler | H04R 3/00 |
| 2024/0303621 | A1 * | 9/2024 | Schäfer | H04R 1/406 |
| 2025/0071505 | A1 * | 2/2025 | McElveen | H04R 3/005 |

OTHER PUBLICATIONS

Maciejewski et al., "Analysis of Robustness of Deep Single-Channel Speech Separation Using Corpora Constructed From Multiple Domains", 2019 IEEE Workshop On Applications of Signal Processing To Audio and Acoustics (WASPAA), IEEE, Oct. 20, 2019, pp. 165-169.

Higuchi et al., "Adversarial training for data-driven speech enhancement without parallel corpus", 2017 IEEE Automatic Speech Recognition and Understanding Workshop (ASRU), IEEE, Dec. 16, 2017, pp. 40-47.

Zhao et al., "Monaural Speech Dereverberation Using Temporal Convolutional Networks With Self Attention", IEEE/ACM Transactions On Audio, Speech, and Language Processing, IEEE, USA, vol. 28, May 18, 2020, pp. 1598-1607.

Hussain et al., "Ensemble Hierarchical Extreme Learning Machine for Speech Dereverberation", IEEE Transactions On Cognitive and Developmental Systems, IEEE, vol. 12, No. 4, Nov. 19, 2019, pp. 744-758.

Szoke et al., Building and Evaluation of a Real Room Impulse Response Dataset, IEEE Journal of Selected Topics in Signal Processing, IEEE, US, vol. 13, No. 4, Aug. 1, 2019, pp. 863-876.

Wuth et al., "Non causal deep learning based dereverberation", Arxiv.org, Cornell University Library, 201 Olin Library Cornell University Ithaca, NY 14853, Sep. 7, 2020.

* cited by examiner

AUDIO SYSTEM, AUDIO DEVICE, AND METHOD FOR SPEAKER EXTRACTION

The present disclosure relates to an audio system, an audio device, and related methods, in particular for speech extraction from an audio signal.

BACKGROUND

In many communication situations, audio systems and audio devices may be used for communication. When an audio device, e.g., a headset, a headphone, a hearing aid, or a transducer such as a microphone, is used for communication, it is desirable to transmit solely the speech of the person using the audio device. For instance, in an office or call centre usage situation, interfering speech, e.g., jamming speech, from other people in the room may disturb communication with a far-end party. Furthermore, confidentiality concerns may dictate that speech other than that of the audio device user's speech should not be transmitted to the far-end party.

Although the audio device user's speech is typically louder than interfering speech at the audio device, the classical approaches, such as using single channel speech separation methods to suppress interfering speech, suffer from a speaker ambiguity problem.

SUMMARY

Accordingly, there is a need for audio system, audio device, and methods with improved speech extraction, such as separating the audio device user's speech from the interfering speech also denoted jammer speech and/or noise e.g., ambient noise, white noise, etc.

A method for speech extraction in an audio device is disclosed, the method comprising obtaining a microphone input signal from one or more microphones including a first microphone; applying an extraction model to the microphone input signal for provision of an output; extracting a near speaker component and/or a far speaker component in the microphone input signal, e.g. according to the output of the extraction model for example being a machine-learning model for provision of a speaker output; and outputting the speaker output.

Also disclosed is an audio device comprising a processor, an interface, a memory, and one or more microphones, wherein the audio device is configured to obtain a microphone input signal from the one or more microphones including a first microphone; apply an extraction model to the microphone input signal for provision of an output; extract a near speaker component in the microphone input signal, e.g. according to the output of the extraction model, for example being a machine-learning model, for provision of a speaker output; and output, via the interface, the speaker output.

Also disclosed is a computer-implemented method for training an extraction model for speech extraction in an audio device. The method comprising obtaining clean speech signals; obtaining room impulse response data indicative of room impulse response signals; generating a set of reverberant speech signals based on the clean speech signals and the room impulse response data; generating a training set of speech signals based on the clean speech signals and the set of reverberant speech signals; and training the extraction model based on the training set of speech signals.

The present disclosure allows for improved extraction of a near speaker component in a microphone input signal for provision of a near speaker signal, such as the speech of the audio device user. The present disclosure also allows for improved interfering speech e.g., jamming speech, suppression in a microphone input signal.

The present disclosure provides an improved speech extraction from a single microphone input signal, which in turn may alleviate the speaker permutation problem of single-channel microphone separation methods. Further, the present disclosure may alleviate the speaker ambiguity problem, e.g. by improving separation of near and far speakers.

Further, the present disclosure provides improved speech separation of speaker's speech, interfering speech, and noise e.g., ambient noise, white noise, etc., from a single microphone input signal obtained from a single microphone of an audio device or obtained as a combined microphone input signal based on microphone input signals from a plurality of microphones.

BRIEF DESCRIPTION OF THE DRAWINGS

The above and other features and advantages of the present invention will become readily apparent to those skilled in the art by the following detailed description of example embodiments thereof with reference to the attached drawings, in which.

DETAILED DESCRIPTION

Figure 1:
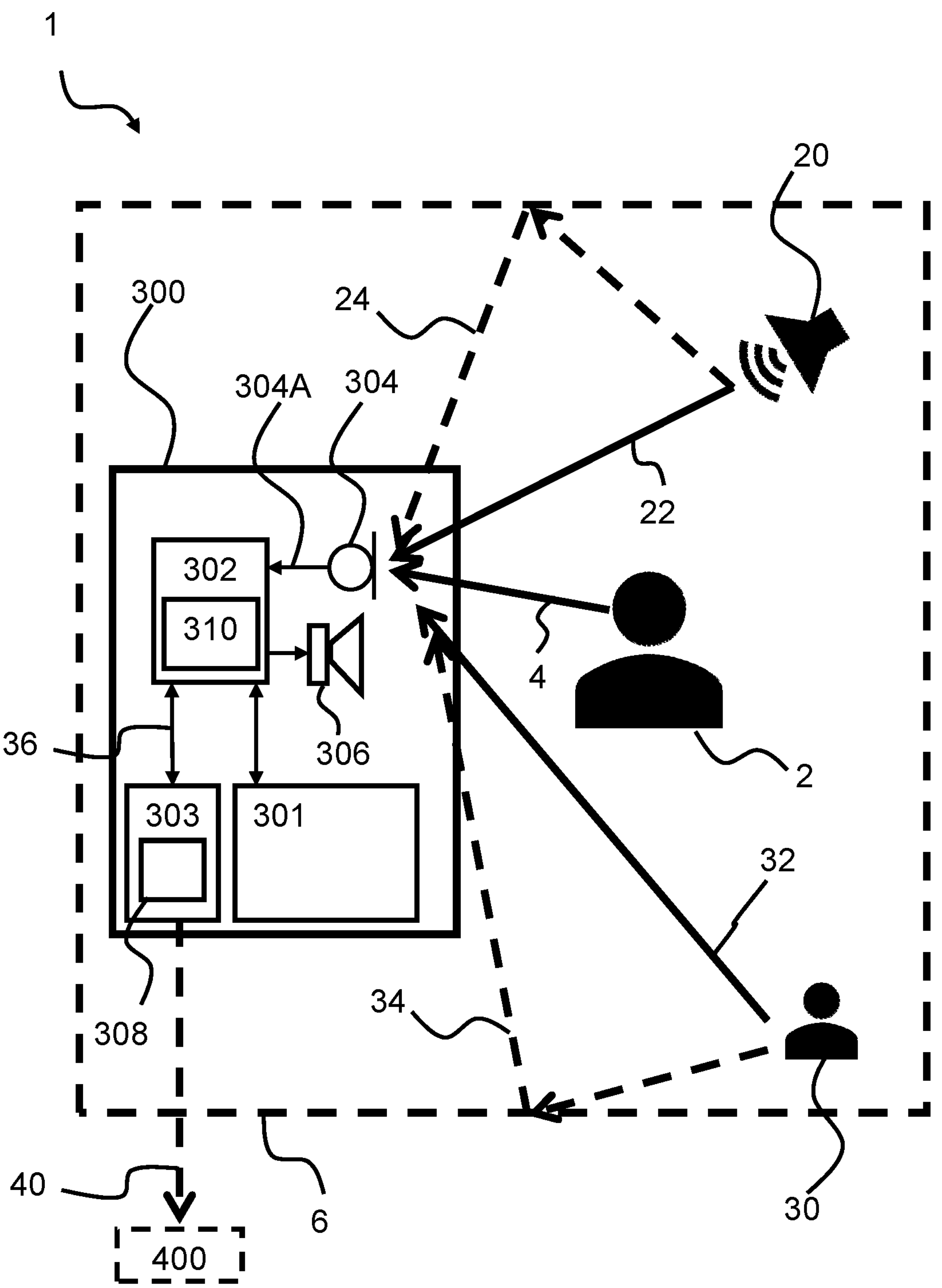
FIG. 1 schematically illustrates an example hearing system according to the disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A method for speech extraction in an audio device is disclosed. In one more example methods, the speech extraction may be seen as speech separation in an audio device. The audio devices may be one or more of: headsets, audio signal processors, headphones, computers, mobile phones, tablets, servers, microphones, and/or speakers.

The audio device may be a single audio device. The audio device may be a plurality of interconnected audio devices, such as a system, such as an audio system. The audio system may comprise one or more users. It is noted that the term speaker may be seen as the user of the audio device. The audio device may be configured to process audio signals. The audio device can be configured to output audio signals. The audio device can be configured to obtain, such as receive, audio signals. The audio device may comprise one or more processors, one or more interfaces, a memory, one or more transducers, and one or more transceivers.

In one or more example audio devices, the audio device may comprise a transceiver for wireless communication of the speaker output. In one or more example audio devices, the audio device may facilitate wired communication of the speaker output via an electrical cable.

In one or more example audio devices, the interface comprises a wireless transceiver, also denoted as a radio transceiver, and an antenna for wireless transmission of the output audio signal, such as the speaker output. The audio device may be configured for wireless communication with one or more electronic devices, such as another audio device, a smartphone, a tablet computer and/or a smart watch. The audio device optionally comprises an antenna for converting one or more wireless input audio signals to antenna output signal(s).

In one or more example audio devices, the interface comprises a connector for wired output of the output audio signal, such as the speaker output, via a connector, such as an electrical cable.

The one or more interfaces can be or include wireless interfaces, such as transmitters and/or receivers, and/or wired interfaces, such as connectors for physical coupling. For example, the audio device may have an input interface configured to receive data, such as a microphone input signal. In one or more example audio devices, the audio device can be used for all form factors in all types of environments, such as for headsets. For example, the audio device may not have a specific microphone placement requirement. In one or more example audio devices, the audio device may comprise a microphone boom, wherein one or more microphones are arranged at a distal end of the microphone boom.

The method comprises obtaining a microphone input signal from one or more microphones including a first microphone. The microphone input signal may be a microphone input signal from a single microphone, such as a first microphone input signal from a first microphone, or a microphone input signal being a combination of a plurality of microphone input signals from a plurality of microphones, such as a combination of at least a first microphone input signal from a first microphone and a second microphone input signal from a second microphone.

In one or more example audio devices, the audio device may be configured to obtain a microphone input signal from one or more microphones, such as a first microphone, a second microphone, and/or a third microphone. In one or more example methods, the microphone input signal may comprise a first microphone input signal from the first microphone.

In one or more example methods and/or audio devices, the first microphone input signal may comprise a first primary audio signal indicative of a first speaker speech, a first secondary audio signal indicative of an interfering speech of a second speaker, and a first tertiary audio signal indicative of noise. The first speaker speech is associated with or originates from a first speaker. The interfering speech is associated with or originates from a second speaker, such as a jamming speaker, or a group of second speakers such as jamming speakers.

In one or more example methods and/or audio devices, the first speaker may be seen as the user of the audio device. In one or more example methods, the first speaker may be seen as a near speaker relative to the audio device. In one or more example methods, the second speaker(s) may be seen as a speaker or speakers different from the first speaker. In one or more example methods, the second speaker may be seen as one or more speakers. In one or more example methods, the second speaker may not be a user of the audio device. In one or more example methods, the second speaker may be seen as a far speaker relative to the audio device.

In one or more example methods and/or audio devices, the first speaker and the second speaker may be different. In one or more example methods and/or audio devices, the first speaker's speech and the second speaker's speech may be different from each other. In one or more example methods and/or audio devices, the first speaker's speech and the second speaker's speech may have different audio characteristics, such as different in wavelength, amplitude, frequency, velocity, pitch, and/or tone. In one or more example methods, the second speaker's speech may be seen as interfering speech. In one or more example methods and/or audio devices, the second speaker's speech may be seen as jamming speech.

In one or more example methods and/or audio devices, the noise may be seen as an unwanted sound. In one or more example methods and/or audio devices, the noise may be one or more of a background noise, an ambient noise, a continuous noise, an intermittent noise, an impulsive noise, and/or a low frequency noise.

The method comprises applying an extraction model to the microphone input signal for provision of an output.

In one or more example audio devices, the audio device may be configured to obtain the microphone input signal from one or more microphones, including the first microphone. In one or more example audio devices, the audio device may comprise an extraction model. In one or more example audio devices, the audio device may be configured to apply the extraction model to the microphone input signal for provision of an output. In one or more example methods, applying the extraction model to the microphone input signal comprises applying the extraction model to the first microphone input signal. In one or more example audio devices, the audio device may be configured to apply the extraction model to the microphone input signal for provision of an output indicative of the first speaker's speech.

In one or more example methods and/or audio devices, the extraction model may be a machine learning model. The extraction model, such as model coefficients, may be stored in the memory of the audio device. In one or more example methods and/or audio devices, the machine learning model may be an off-line trained neural network. In one or more example methods and/or audio devices, the neural network may comprise one or more input layers, one or more intermediate layers, and/or one or more output layers. The one or more input layers of the neural network may receive the microphone input signal as the input. The one or more input layers of the neural network may receive the first microphone input signal as the input.

In one or more example methods, the one or more output layers of the neural network may provide one or more output parameters indicative of one or more extraction model output parameters for provision of a speaker output, e.g., separating a first primary audio signal from the first microphone input signal. In one or more example methods, the one or more output layers of the neural network may provide one or more frequency bands (frequency band parameters) associated with the microphone input signal as output.

In one or more example methods, the speaker output may be seen as representing the first primary audio signal, such as the first speaker's speech and/or a near speaker signal.

In one or more example methods, the method comprises performing a short-time Fourier transformation or other time-to-frequency domain transformation on a microphone signal from one or more microphones for provision of the microphone input signal. In one or more example methods, the method comprises performing a short-time Fourier transformation or other time-to-frequency domain transformation on a signal from the first microphone for provision of the first microphone input signal or the microphone input signal. In one or more example methods, applying the extraction model to the microphone input signal may comprise performing a power normalization on the microphone input signal. In one or more example methods, applying the extraction model to the microphone input signal may comprise performing a power normalization on the first microphone input signal. In other words, the microphone input signal may be a frequency domain representation, such as an M-band FFT, e.g. where M is in the range from 4 to 4096 with typical sampling rates 8, 16, 44.1, or 48 kHZ.

In one or more example methods, the input to the neural network may be a power normalized microphone input signal. In one or more example methods, the short-time Fourier transformation is performed on a microphone signal for provision of the microphone input signal as a frequency-domain microphone input signal or short-time Fourier transformed microphone signal. In one or more example methods, the method comprises performing a power normalization on the microphone input signal. In one or more example methods, the extraction model is applied on a frequency-domain microphone input signal. In one or more example methods, the extraction model may be applied on the frequency-domain microphone input signal which may also be power normalized.

The method comprises extracting one or more speaker components, such as a near speaker component and/or a far speaker component, in the microphone input signal, e.g. according to or based on the output of the extraction model, e.g. being a machine-learning model, for provision of a speaker output.

A near speaker component may be a speaker component from a near-field speaker within 10 cm or within 30 cm from the microphone(s)/audio device. Thus, the near component in the microphone input signal may be seen as an audio signal that may be originated within 10 cm distance or within 30 cm distance of the one or more microphones of the audio device, such as the first microphone. For example, when the first speaker is using the audio device, e.g., wearing a headset comprising a microphone, the distance from the mouth of the first speaker to the first microphone of the audio device may be seen as a near-field.

A far speaker component may be a speaker component from a far speaker at a distance larger than 10 cm or larger than 30 cm from the microphone(s)/audio device. It is noted that the near speaker may be seen as a speaker who is in proximity, such as with in 30 cm, to the microphone(s)/audio device. The far speaker may be seen as who is far, such as farther than 30 cm, from the microphone(s)/audio device.

In one or more example audio devices, the audio device may be configured to extract a near component in the microphone input signal based on the output of the extraction model, i.e., based on the one or more extraction model output parameters.

In one or more example methods and/or audio devices, the near component in the microphone input signal may be seen as an audio signal that may be originated within 20 cm distance from the one or more microphone of the audio device, such as the first microphone. In one or more example methods, a speaker at a distance larger than 30 cm from the audio device may be seen a far speaker. In one or more example methods, a distance within 30 cm from the audio device may be seen as near. In one or more example methods, a distance larger than 20 cm from the audio device may be seen as far. In one or more example methods, a distance larger than 10 cm from the audio device may be seen as far. In one or more example methods and/or audio devices, a sound signal originated from a source, such as the second speaker, at a farther distance, such as distance greater than 30 cm, may be seen as far speaker signal.

Near may be seen as region in which the sound field does not decrease by 6 dB each time the distance from the sound source is increased. In one or more example methods and/or audio devices, a sound signal originated in the near field may be associated with the first speaker speech. In one or more example methods and/or audio devices, the speaker output may be the first primary audio signal. It should be noted that the sound signal may also be seen as the audio signal.

In one or more example methods and/or audio devices, the audio signal may be defined as far audio signal or near audio signal dynamically based on direct-to-reverberant energies associated with audio signals. In this regard, it is noted that far audio/speech signal is mainly reverberant and near audio/speech signal is mainly direct or non-reverberant.

In one or more example methods and/or audio devices, the near speaker component may be indicative of an audio signal associated with the first speaker speech. In one or more example audio devices, the audio device may be configured to extract, based on the one or more extraction model output parameters, a near speaker component in the microphone input signal. In one or more example audio devices, the audio device may be configured to separate, based on the one or more extraction model output parameters, a near speaker component in the microphone input signal.

The method comprises outputting the speaker output. In one or more example methods, the method comprises outputting, such as transmitting, the speaker output, e.g. via a wireless transceiver of the audio device. In one or more example methods, the method comprises outputting, such as storing, the speaker output in memory of the audio device.

In one or more example methods and/or audio devices, the first primary audio signal (i.e., the first speaker's speech) may be seen as the speaker output. In one or more example audio devices, the audio device may be configured to output the speaker output. In one or more example methods and/or audio devices, the speaker output may not comprise the interfering speech of the second speaker and the noise. In one or more example methods, outputting the speaker output by the audio device may comprise transmitting, using a wireless transceiver and/or a wired connector, the speaker output to an electronic device (such as a smart phone, a second audio device, such as a headset and/or an audio speaker).

In one or more example methods, the method comprises determining a near speaker signal based on the near speaker component.

In one or more example audio devices, the audio device may be configured to determine a near speaker signal based on the near speaker component.

In one or more example methods, the near speaker signal may be seen as speaker output or a first speaker output of the speaker output. In one or more example methods, the near speaker signal may be indicative of the first speaker's speech.

In one or more example methods, the method comprises outputting the near speaker signal as the speaker output. The method may comprise outputting the near speaker signal as a first speaker output of the speaker output.

In one or more example audio devices, the audio device may be configured to output the near speaker signal as the speaker output. In one or more example methods, outputting the speaker output may comprise outputting the near speaker signal. In one or more example methods, outputting speaker output may not comprise outputting the second speaker speech (i.e., the far speaker signal). In one or more example methods, outputting speaker output may not comprise outputting the noise.

In one or more example methods, extracting a near speaker component in the microphone input signal comprises determining one or more mask parameters including a first mask parameter or first mask parameters based on the output of the extraction model.

In one or more example methods, the audio device may be configured to extract the speaker component in the microphone input signal. In one or more example methods, the audio device may be configured to determine one or more mask parameters, such as a plurality of mask parameters, including a first mask parameter based on the one or more extraction model output parameters.

In one or more example methods, the one or more mask parameters, such as first mask parameter(s), second mask parameter(s), and/or third mask parameter(s), may be filter parameters and/or gain coefficients. In one or more example methods, the method comprises masking the microphone input signal based on the one or more masking parameters.

In one or more example methods, the method comprises applying the mask parameters to the microphone input signal. In one or more example methods, the method comprises separating, e.g. by using or applying first mask parameter(s), the near speaker signal, such as the first speaker's speech, from the microphone input signal. In other words, the speaker output may comprise a first speaker output representative of the near speaker signal. In one or more example methods, the method comprises separating, e.g. by using or applying second mask parameter(s), the far speaker signal, such as the interfering speaker's speech, from the microphone input signal. In other words, the speaker output may comprise a second speaker output representative of the far speaker signal, wherein the second speaker output is separate from the first speaker output. In one or more example methods, the method comprises separating, e.g. by using the mask parameter(s), the noise from the microphone input signal. In other words, the speaker output may comprise a third speaker output representative of a noise signal, wherein the third speaker output is separate from the first speaker output and/or the second speaker output.

In one or more example methods, the machining learning model is an off-line trained neural network.

In one or more example methods, the audio device may comprise an extraction model. The extraction model may be a machine learning model. The machine learning model may be an off-line trained neural network. In one or more example methods, the off-line trained neural network may be trained to output one or more output parameters for provision of the speaker output, such as one or more of a near speaker component, far speaker component, and an ambient noise component.

In one or more example methods, the extraction model comprises a deep neural network.

In one or more example methods and/or audio devices, the audio device may comprise the extraction model. For example, the extraction model may be stored in memory of the audio device. In one or more example audio devices, the extraction model comprises a deep neural network. In one or more example methods, the deep neural network may be trained to output one or more output parameters for provision of the near speaker component. In one or more example methods, the output of the deep neural network may be or comprise one or more of a frame of cleaned up time-domain signal, a frame of cleaned up frequency-domain signal, e.g., FFT, a gain vector, one or more filter coefficients, and one or more parameters for reconstruction of cleaned up time-domain signal.

In one or more example methods and/or audio devices, the deep neural network may be a recurrent neural network, e.g., one to one, one to many, many to one, many to many. In one or more example methods and/or audio devices, the deep neural network may be a convolutional neural network. In one or more example methods and/or audio devices, the deep neural network may be a Region-Based Convolutional Neural Network. In one or more example methods and/or audio devices, the deep neural network may be a wavenet neural network. In one or more example methods and/or audio devices, the deep neural network may be a gaussian mixture model. In one or more example methods and/or audio devices, the deep neural network may be a regression model. In one or more example methods and/or audio devices, the deep neural network may be a linear factorization model. In one or more example methods and/or audio devices, the deep neural network may be a kernel regression model. In one or more example methods and/or audio devices, the deep neural network may be a Non-Negative Matrix Factorization model.

In other words, the extraction model may comprise one or more of a recurrent neural network, a convolutional neural network, a Region-Based Convolutional Neural Network, a wavenet neural network, a gaussian mixture model, a regression model, a linear factorization model, a kernel regression model, and Non-Negative Matrix Factorization model. The extraction model may be a speech extraction model configured to extract speech or parameters, such mask parameters, for extracting speech from a microphone input signal.

In one or more example methods, obtaining a microphone input signal comprises performing short-time Fourier transformation on a microphone signal from one or more microphones for provision of the microphone input signal. In other words the microphone input signal may be a frequency-domain microphone input signal.

In one or more example audio devices, the audio device may be configured to apply a short-time Fourier transformation on a microphone signal from one or more microphones for provision of the microphone input signal. In one or more example audio devices, the audio device may be configured to apply the short-time Fourier transformation on the first microphone input signal from the first microphone. The microphone input signals from the microphones may be frequency-domain microphone input signals.

In one or more example methods, the extraction model may be applied to the short-time Fourier transformed microphone input signal. In one or more example methods, the short-time Fourier transformed microphone input signal may be provided as input to the neural network.

In one or more example methods, the method comprises performing inverse short-time Fourier transformation on the speaker output for provision of an electrical output signal.

In one or more example audio devices, the audio device may be configured to apply inverse short-time Fourier transformation on the speaker output for provision of an electrical output signal. In one or more example methods, applying inverse short-time Fourier transformation on the speaker output may comprise applying inverse short-time Fourier transformation on one or more of a near speaker signal, a far speaker signal, and noise. In one or more example audio devices, the electrical output signal may be transmitted to the electronic device by using the one or more transceivers of the audio device.

In one or more example methods, the method comprises extracting a far speaker component in the microphone input signal according to the output of the extraction model.

In one or more example audio devices, the audio device may be configured to extract a far speaker component in the microphone input signal according to the output of the extraction model. Extraction from the microphone input signal may also be seen as separation from the other components or parts of the microphone input signal.

In one or more example methods, extracting the far speaker component in the microphone input signal may be based on the one or more mask parameters, such as second mask parameter(s). In one or more example methods, the method comprises determining a far speaker signal based on the far speaker component. In one or more example methods, the far speaker signal may be seen as an interfering audio signal, such as the second speaker's speech.

It is an advantage of the present disclosure that one or more of a near speaker signal, a far speaker signal, and noise can be extracted or separated from each other from one or a single microphone input signal.

In one or more example methods, the method comprises extracting an ambient noise component in the microphone input signal according to the output of the extraction model.

In one or more example audio devices, the audio device may be configured to extract an ambient noise component in the microphone input signal according to the output of the extraction model. In one or more example methods, extracting an ambient noise component in the microphone input signal is based on the one or more mask parameters, such as third mask parameter(s). In one or more example methods, the method comprises determining a noise signal based on the ambient noise component. In one or more example methods, the noise signal may be seen as an interfering audio signal, such as audible sound generated by machines in the far.

It is an advantage of present disclosure that a noise signal, i.e., an interfering audio signal, can be differentiated from a near speaker signal and/or a far speaker signal which in turn helps to suppress the noise alone.

In one or more example methods, obtaining the microphone input signal from one or more microphones comprises obtaining a first microphone input signal from a first microphone of the one or more microphones. In one or more example methods, obtaining the microphone input signal from one or more microphones comprises obtaining a second microphone input signal from a second microphone of the one or more microphones. In one or more example methods, obtaining the microphone input signal from one or more microphones comprises obtaining a combined microphone input signal based on the first microphone input signal and second microphone input signal.

In one or more example audio devices, the audio device may be configured to receive a microphone input signal from one or more microphones, such as the first microphone, the second microphone and/or the third microphone.

In one or more example methods and/or audio devices, the microphone input signal is based on one or more of the first microphone input signal, the second microphone input signal, and the combined microphone input signal.

In one or more example audio devices, the audio device may be configured to combine, such as one or more of beamform, add, filter, amplify, and subtract, the first microphone input signal obtained from the first microphone and the second microphone input signal obtained from the second microphone for provision of the combined microphone input signal.

In one or more example methods, the extraction model may be applied to one or more of the first microphone input signal obtained from the first microphone, the second microphone input signal obtained from the second microphone, and the combined microphone input signal based on the first microphone input signal and second microphone input signal for provision of a speaker output.

An audio device is disclosed. The audio device may be configured to be worn at an ear of a user and may be a hearable or a hearing aid, wherein the processor is configured to compensate for a hearing loss of a user.

The audio device may be of the communication headset type, the headset type with long boom arm, the headset type with short boom arm, the headset type with no boom arm, the behind-the-ear (BTE) type, in-the-ear (ITE) type, in-the-canal (ITC) type, receiver-in-canal (RIC) type, or receiver-in-the-ear (RITE) type.

The audio device may be configured for wireless communication with one or more devices, such as with another audio device, e.g. as part of a binaural audio or hearing system, and/or with one or more accessory devices, such as a smartphone and/or a smart watch. The audio device optionally comprises an antenna for converting one or more wireless input signals, e.g. a first wireless input signal and/or a second wireless input signal, to antenna output signal(s). The wireless input signal(s) may origin from external source(s), such as computer(s), laptop(s), tablet(s), smartphone(s), smartwatch(es), spouse microphone device(s), wireless TV audio transmitter, and/or a distributed microphone array associated with a wireless transmitter. The wireless input signal(s) may origin from another audio device, e.g. as part of a binaural audio system, and/or from one or more accessory devices.

The audio device optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The audio device may comprise a plurality of antennas and/or an antenna may be configured to be operate in one or a plurality of antenna modes. The transceiver input signal optionally comprises a first transceiver input signal representative of the first wireless signal from a first external source.

The audio device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more example audio devices, the number N of microphones is two, three, four, five or more. The set of microphones may comprise a third microphone for provision of a third microphone input signal.

It is noted that descriptions and features of audio device functionality, such as audio device configured to, also apply to methods and vice versa. For example, a description of an audio device configured to determine also applies to a method, e.g. of operating a audio device, wherein the method comprises determining and vice versa.

FIG. 1 schematically illustrates an example scenario with an audio device 300, such as a headset or an earpiece, according to the present disclosure. The scenario 1 includes a speaker or user 2 wearing the audio device 300. The audio device 300 comprises a memory 301 storing an extraction model or at least parameters thereof, one or more processors including processor 302, an interface 303, and one or more microphones including first microphone 304 for obtaining a first microphone input signal 304A as a microphone input signal. The first microphone 304 may be arranged on a microphone boom (not shown). The audio device 300 optionally comprises a receiver also denoted loudspeaker 306 for provision of an audio signal to the user 2. The interface 303 comprises a wireless communication module 308 comprising a radio transceiver and antenna. The audio device may comprise an extraction model 310 stored in the memory 301.

The scenario 1 includes the (first) speaker 2. The speaker 2 may be seen as a user of the audio device 300 and when speaking, the speaker 2 provides a near speaker signal 4 also denoted first primary audio signal. Further, the scenario 1 includes one or more noise sources including noise source 20 and a second speaker 30 also denoted an interfering speaker or jammer. The noise source 20 provides a noise signal 22 and a noise echo 24 reflected by sound reflecting object, such as wall 6 in scenario 1. Noise signal 22 and a noise echo 24 are commonly also denoted first tertiary audio signal. The second speaker 30 provides interfering audio signal 32 and interfering echo 34 reflected by sound reflecting object, such as wall 6 in scenario 1. Interfering audio signal 32 and interfering echo 34 are commonly also denoted first secondary audio signal.

The audio signals 4, 22, 24, 32, 34 are received and detected by the first microphone 304 which provides the first microphone input signal 304A containing a near speaker component representing the near speaker signal 4, a far speaker component representing the interfering audio signal 32 and interfering echo 34, and an ambient noise component representing the noise signal 22 and a noise echo 24.

In one or more example audio systems, the interfering speaker 30 may be seen as a group comprising one or more interfering speakers.

The processor 302 is configured to obtain a microphone input signal based on the first microphone input signal 304A, e.g. as a frequency-domain representation of the first microphone input signal 304A. The processor 302 is configured to apply the extraction model 310 to the microphone input signal for provision of an output; extracting a near speaker component in the microphone input signal according to the output of the extraction model being a machine-learning model for provision of a speaker output 36; and outputting the speaker output 36, e.g. via interface 303/wireless communication module 308 as wireless output signal 40.

The one or more processors 302 may be configured to separate the first secondary audio signal 32 (far speaker component) from the microphone input signal by applying the extraction model 306 on the microphone input signal and optionally extracting a far speaker component in the microphone input signal according to the output of the extraction model, e.g. based on second mask parameter(s), for provision of a (second) speaker output. The one or more processors 302 may be configured to separate the first tertiary audio signal 22 (noise component) from the microphone input signal by applying the extraction model 306 on the microphone input signal and optionally extracting a noise component in the microphone input signal according to the output of the extraction model, e.g. based on third mask parameter(s), for provision of a (third) speaker output. The extraction model may be a machine learning model. The extraction model may comprise a trained neural network. The extraction model may be a deep neural network.

The audio device 300 may be configured to output, e.g. via the interface 303, the speaker output, such as one or more of the first speaker output, the second speaker output, and the third speaker output. The first primary audio signal may be seen as the near speaker signal, such as the speaker's 2 speech. The first secondary audio signal may be seen as the far speaker signal (such as the interfering speaker's 30 speech). The first tertiary audio signal may be seen as a noise signal, such as the noise signal 22.

The audio device 300 may be configured to transmit, using one or more transceivers of the communication module 308, the speaker output, such as one or more of the first speaker output, the second speaker output, and the third speaker output, to an electronic device 400. The electronic device 400 may be an audio device, a mobile device, such as a smartphone, a smartphone, or a tablet, and/or a server device.

In one or more example audio devices, the extraction model 310 or at least model parameters may be stored in part of the memory 301.

Figure 2:
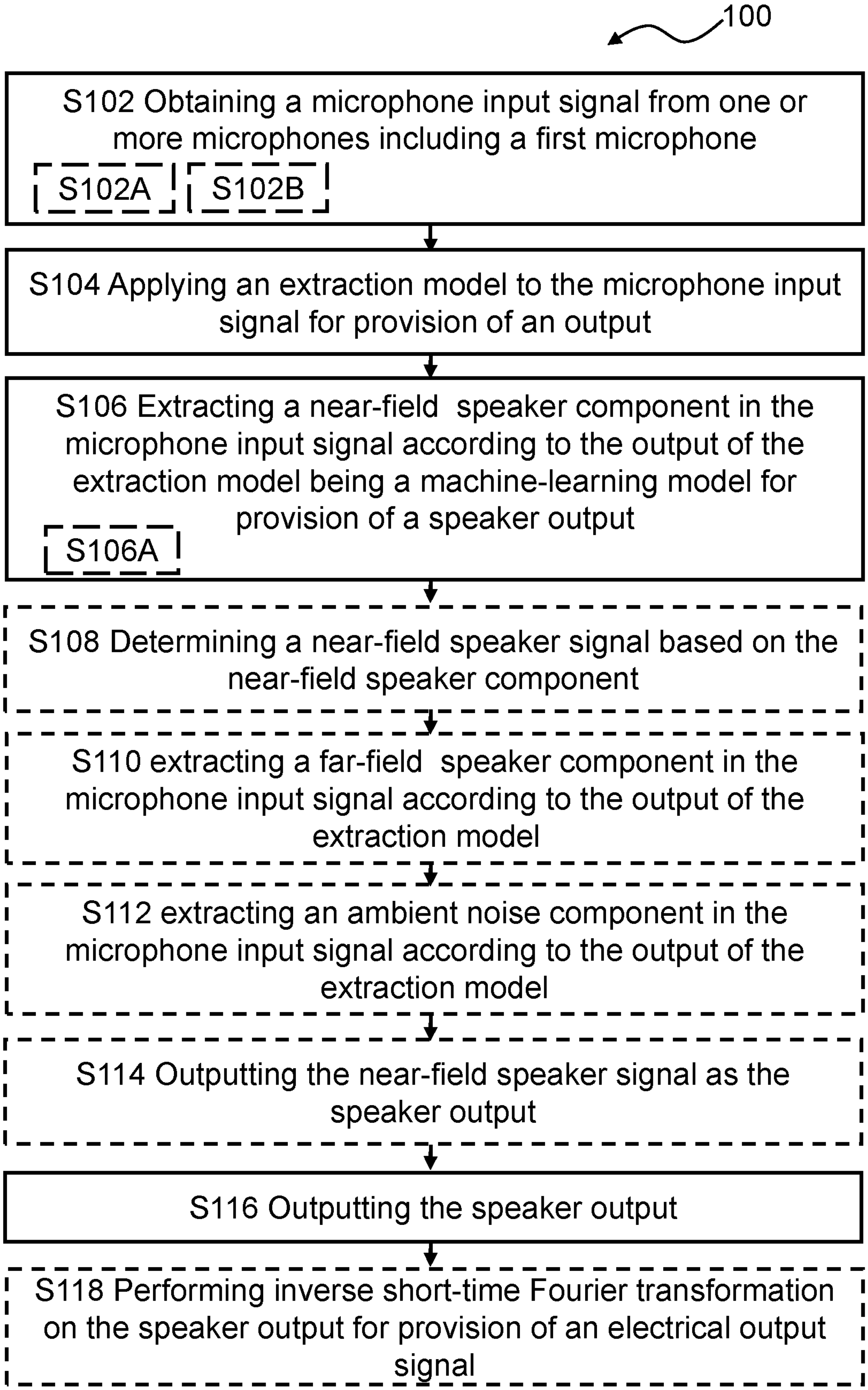
FIG. 2 is a flow diagram of an example method according to the disclosure.

The audio device 300 may be configured to perform any of the methods disclosed herein, e.g. as described in relation to FIG. 2.

The audio device may be configured for, e.g. via wireless communication module 310, wireless communications via a wireless communication system, such as short-range wireless communications systems, such as Wi-Fi, Bluetooth, Zigbee, IEEE 802.11, IEEE 802.15, infrared and/or the like.

The audio device may be configured for, e.g. via wireless communication module 310, wireless communications via a wireless communication system, such as a 3GPP system, such as a 3GPP system supporting one or more of: New Radio, NR, Narrow-band IoT, NB-IoT, and Long Term Evolution—enhanced Machine Type Communication, LTE-M, millimeter-wave communications, such as millimeter-wave communications in licensed bands, such as device-to-device millimeter-wave communications in licensed bands.

It will be understood that all the internal components of the audio device have not been shown in the FIG. 1, and the disclosure should not be limited to the components shown in the FIG. 1.

Optionally, the audio device 300 comprises a second microphone (not shown) for provision of a second microphone input signal. The first microphone input signal 304A and the second microphone input signal may be combined in processor 302, such as beamformed, for forming the microphone input signal.

FIG. 2 is a flow diagram of an example method 100 for speech extraction in an audio device is disclosed. The audio device may comprise a memory, one or more processors, one or more interfaces, one or more transducers and/or one or more transceivers. The method 100 may be performed by an audio device such as the audio device 300 of FIG. 1.

The method 100 comprises obtaining S102 a microphone input signal from one or more microphones including a first microphone. The microphone input signal may be a single microphone input signal.

The method 100 comprises applying S104 an extraction model to the microphone input signal for provision of an output.

The method 100 comprises extracting S106 a near speaker component in the microphone input signal according to the output of the extraction model being a machine-learning model for provision of a speaker output.

The method 100 comprises outputting S116 the speaker output.

In one or more example methods, the method 100 comprises determining S108 a near speaker signal based on the near speaker component.

In one or more example methods, the method 100 comprises outputting S114 the near speaker signal as the speaker output.

In one or more example methods, extracting S106 a near speaker component in the microphone input signal comprises determining S106A one or more mask parameters including a first mask parameter based on the output of the extraction model.

In one or more example methods, the machining learning model is an off-line trained neural network.

In one or more example methods, the extraction model comprises deep neural network.

In one or more example methods, obtaining a microphone input signal comprises performing S102B short-time Fourier transformation on a microphone signal from one or more microphones for provision of the microphone input signal.

In one or more example methods, the method 100 comprises performing S118 inverse short-time Fourier transformation on the speaker output for provision of an electrical output signal.

In one or more example methods, the method 100 comprises extracting S110 a far speaker component in the microphone input signal according to the output of the extraction model.

In one or more example methods, the method 100 comprises extracting S112 an ambient noise component in the microphone input signal according to the output of the extraction model.

In one or more example methods, obtaining S102 the microphone input signal from one or more microphones including a first microphone comprises obtaining S102A one or more of a first microphone input signal, a second microphone input signal, and a combined microphone input signal based on the first microphone input signal and second microphone input signal. In one or more example methods, the microphone input signal is based on one or more of the first microphone input signal, the second microphone input signal, and the combined microphone input signal.

Figure 3:
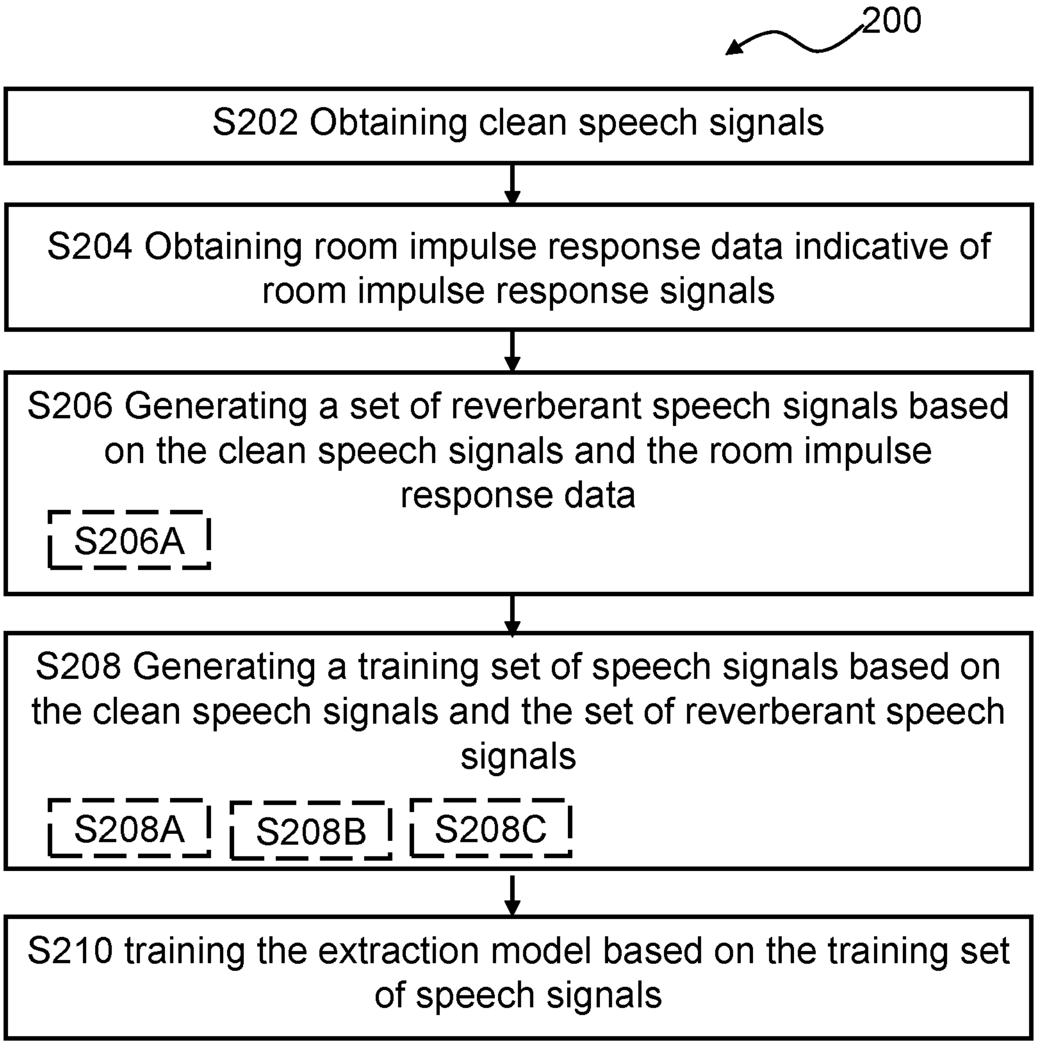
FIG. 3 is a flow diagram of an example computer-implemented method according to the disclosure.

FIG. 3 is a flow diagram of an example computer-implemented method 200 for training an extraction model for speech extraction in an audio device.

In one or more example methods, the method 200 may be performed in an electronic device, such as a mobile phone, an audio device, a tablet, a computer, a laptop, and/or a server device, such as a cloud server. The electronic device may comprise a processor, a memory, and an interface. The electronic device may comprise an extraction model in part of a memory.

The method 200 comprises obtaining S202, such as retrieving from a database, clean speech signals. The clean speech signals may be indicative of semi-anechoic speech signals or near speaker signals. The clean speech signals may be retrieved from a database of clean speech signals. In one or more example methods, the clean speech signals may be seen as near speaker signals. In one or more example methods, the clean speech signals may be seen as audio signals without far speaker signals and/or noise, such as ambient noise. In one or more example methods, the clean speech signals may be seen as anechoic audio signals. In one or more example methods, obtaining clean speech signals may comprise obtaining clean speech signals from a memory of an electronic device, such as the audio device 300 of FIG. 1, a mobile device, a computer, and/or a server device.

The method 200 comprises obtaining S204 room impulse response data indicative of room impulse response signals or room transfer functions of a room.

In one or more example methods, the room impulse data may comprise one or more room impulse response signals. In one or more example methods, the room impulse data may comprise one or more room transfer functions representing an audio path from a sound source in the room to the microphone(s) of the audio device. In one or more example methods, room impulse response signals may be seen as an echo of clean speech signals. In one or more example methods, room impulse response signals may be seen as interfering speaker signals. In one or more example methods, room impulse response signals may comprise far speaker signals. In one or more example methods, room impulse response signals may comprise echo of far speaker signals. In one or more example methods, room impulse response signals may comprise echo of near speaker signals.

In one or more example methods, the room impulse response data may be indicative of simulated acoustics of a user environment, such as room for using an audio device. In one or more example methods, the room impulse response data may comprise impulse responses associated with or for near speaker signal and/or far speaker signal.

In one or more example methods, the room response data may comprise one or more on or more simulated room impulse response signals based on the clean speech signals.

In one or more example methods, obtaining the room response data may comprise obtaining clean speech signals from a memory of the electronic device, such as the audio device 300 of FIG. 1, a mobile device, a computer, and/or a server device.

The method 200 comprises generating S206 a set of reverberant speech signals based on the clean speech signals and the room impulse response data. In one or more example methods, generating S206 a set of reverberant speech signals based on the clean speech signals and the room impulse response data comprises convolving 206A a clean speech signal, e.g. randomly selected from a database of clean speech signals, and a room impulse response of the room impulse response data for generating a reverberant speech signal of the set of reverberant speech signal.

Thus, a reverberant speech signal may be seen as an audio signal comprising a clean speech signal convolved with a room impulse response signal. The reverberant speech signal may be seen as an audio signal with degraded speech quality compared to the clean speech signals.

In one or more example methods, the electronic device may be configured to generate, by using the processor, a set of reverberant speech signals based on the clean speech signals and the room impulse response data.

The method 200 comprises generating S208 a training set of speech signals based on the clean speech signals and the set of reverberant speech signals.

In one or more example methods, generating the training set of speech signals, based on the clean speech signals and the set of reverberant speech signals, may comprise normalizing based on the clean speech signal.

In one or more example methods, generating S208 the training set of speech signal comprises applying 208A a jammer function to at least a subset of the set of reverberant speech signals for provision of jammer speech signals. The jammer function may be a randomized reduction in sound pressure, such as in the range from −15 dB to −3 dB.

In one or more example methods, generating S208 the training set of speech signals comprises normalizing S208B the reverberant speech signals or the jammer speech signals based on the clean speech signals.

In one or more example methods, normalization of the reverberant speech signals or the jammer speech signals may be based on the absolute sound pressure level associated with the reverberant speech signals, the jammer speech signals, and/or the clean speech signals.

In one or more example methods, normalization of the reverberant speech signals or the jammer speech signals may be based on the amplitude level, such as decibels relative to full scale, dB FS, associated with the reverberant speech signals, the jammer speech signals, and/or the clean speech signals.

In one or more example methods, generating S208 the training set of speech signals comprises obtaining S2080 noise signals. In one or more example methods, generating a training set of speech signals is based on the noise signals.

In one or more example methods, obtaining the noise signals may comprise obtaining the noise signals from the memory of the electronic device.

In one or more example methods, the training set of speech signals may be generated by combining two or more of the near speaker signal, such as the clean speech signals or user signals based on clean speech signals convolved with an audio device transfer function representing the audio path from the mouth to the microphone(s) of the audio device, the far speaker signal, such as jammer speech signals, and the noise signal, such as ambient noise. In one or more example methods, combining two or more of the near speaker signals, the far speaker signals, and the noise signals may be based on random selection.

In one or more exemplary methods, the method comprises generating user data, such as first speaker data, near speaker data, and user signals, based on the clean speech signals and audio device transfer function. In one or more exemplary methods, generating user data comprises convolving clean speech signals with the audio device transfer function. In one or more example methods, the audio device transfer function may be indicative of a path taken by an audio signal, such as the near speaker signal, from the mouth of the audio device user to the microphone(s) of the audio device.

In one or more example methods, the training set of speech signals may be based on one or more audio signals which may be based on one or more room conditions (such as a room with different sound reflecting objects and materials), one or more near speaker positions, one or more interfering speaker positions, one or more far speaker positions, one or more audio device positions, one or more ambient noise conditions.

In one or more example methods, the training set of speech signals may be based on one or more audio signals which may be based on one or more near speaker signals, and/or one or more far speaker signals.

In one or more example methods, the set of reverberant speech signals may be subject to one or both of a far function, such as a jammer function, and a noise function for generating the training set of speech signals. The jammer function may be a randomized reduction in sound pressure, such as in the range from −15 dB to −3 dB.

In one or more example methods, the electronic device may be configured to generate, by using the processor, a training set of speech signals based on the clean speech signals and the set of reverberant speech signals.

In one or more example methods, the training set of speech signals may be constructed by super positioning of a near speaker signal/user speech signal, a far field signal/jammer speech signal, and a noise signal.

The method 200 comprises training S210 the extraction model based on the training set of speech signals.

In one or more example methods, training the extraction model may be based on the training set of speech signals comprising a combination of two or more of a near speaker signal, a far speaker signals and a noise signal. In one or more example methods, training the extraction model may comprise imposing an impulse response on to clean speech signals for generating training data.

In one or more example methods, the extraction model may be a machine learning model. In one or more example methods, the machine learning model may be a neural network. In one or more example methods, the neural network may be a deep neural network. In one or more example methods, the deep neural network may receive the training set of speech signals as input for training the deep neural network.

In one or more example methods, the trained deep neural network may be applied to a microphone input signal in an electronic device, such as the audio device 300 of FIG. 1, to extract a near speaker signal from the microphone input signal. In one or more example methods, the trained deep neural network may be applied to separate a far audio signal from and/or a noise signal from the microphone input signal.

In one or more example methods, the neural network may receive a spectrogram of the microphone input signal as input. In one or more example methods, the neural network may output one or more mask parameter for provision of a speaker output, i.e., a near speaker signal, such as a clean speech signal.

In one or more example methods, the neural network may output a mask parameter to separate a near speaker component from the microphone input signal for provision of a speaker output, i.e., a near speaker signal, such as a clean speech signal.

In one or more example methods, the neural network may output a time varying gain parameter to separate a near speaker component from the microphone input signal for provision of a speaker output, i.e., a near speaker signal, such as a clean speech signal.

In one or more example methods, the neural network may output a filter parameter to separate a near speaker component from the microphone input signal for provision of a speaker output (i.e., a near speaker signal, such as a clean speech signal).

It is to be understood that a description of a feature in relation to audio device(s) is also applicable to the corresponding method(s) and vice versa.

Figure 4:
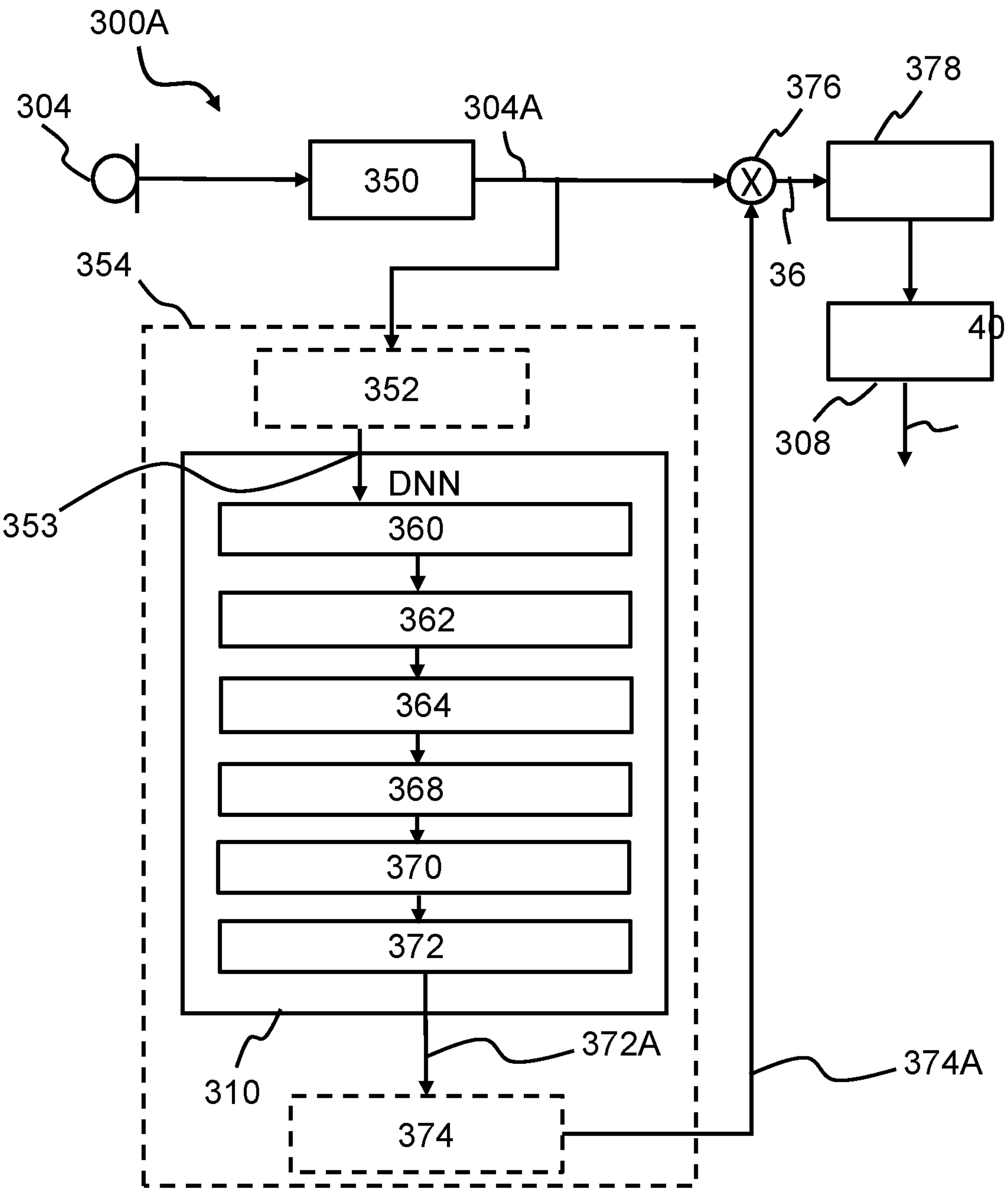
FIG. 4 schematically illustrates an example audio device using a deep neural network from a microphone input signal according to the disclosure, and FIG. 5 schematically illustrates an example system for training set generation according to the disclosure.

FIG. 4 shows a block diagram of an example audio device comprising a deep neural network architecture for speech extraction according to the present disclosure. The audio device comprises a microphone 304 for provision of a microphone signal. The audio device 300A comprises a short-time Fourier transformation, STFT, module 350. The STFT module 350 converts the microphone signal from the first microphone 304 to a first microphone input signal 304A, wherein the first microphone input signal 304A is in the frequency domain.

The audio device comprises an extraction model module 354 comprising a power normalizing module 352 and an extraction model 310, the power normalization configured to perform power normalization on the first microphone input signal 304A and feed the output 353/power-normalized first microphone input signal as input to the extraction model 310. In one or more example extraction model modules, the first microphone input signal 304A may be fed as input to the extraction model 310. The extraction model 310 comprises a deep neural network, DNN, architecture comprising a first feed forward, FF, layer 360 e.g., FF 400 ReLU, a first gated recurrent unit 362, a second recurrent unit 364, a second FF layer 368 e.g., FF 600 ReLU, a third FF layer 370 e.g., FF 600 ReLU and an output layer 372 with a sigmoid activation function e.g., FF (2)*257 sigmoid. The DNN extraction model 310/output layer 372 provides the output 372A of the extraction model 310 to a mask module 374. The mask module 374 provides one or more mask parameters based on the output 372A of the extraction model 310.

The audio device comprises an extraction module 376 to extract, based on the output 374A of the one or more mask parameters, a near speaker component from the first microphone input signal 304A for provision of speaker output 36. The audio device comprises an inverse short-time Fourier transformation, iSTFT, module 378. The extraction module 376 outputs the speaker output 36/near speaker signal to an inverse short-time Fourier transformation, iSTFT, module 378. The iSTFT, module 378 converts the frequency domain speaker output 36/near speaker signal to time domain speaker output that is fed to wireless communication module 308 for provision of wireless output signal 40 to an electronic device.

Figure 5:
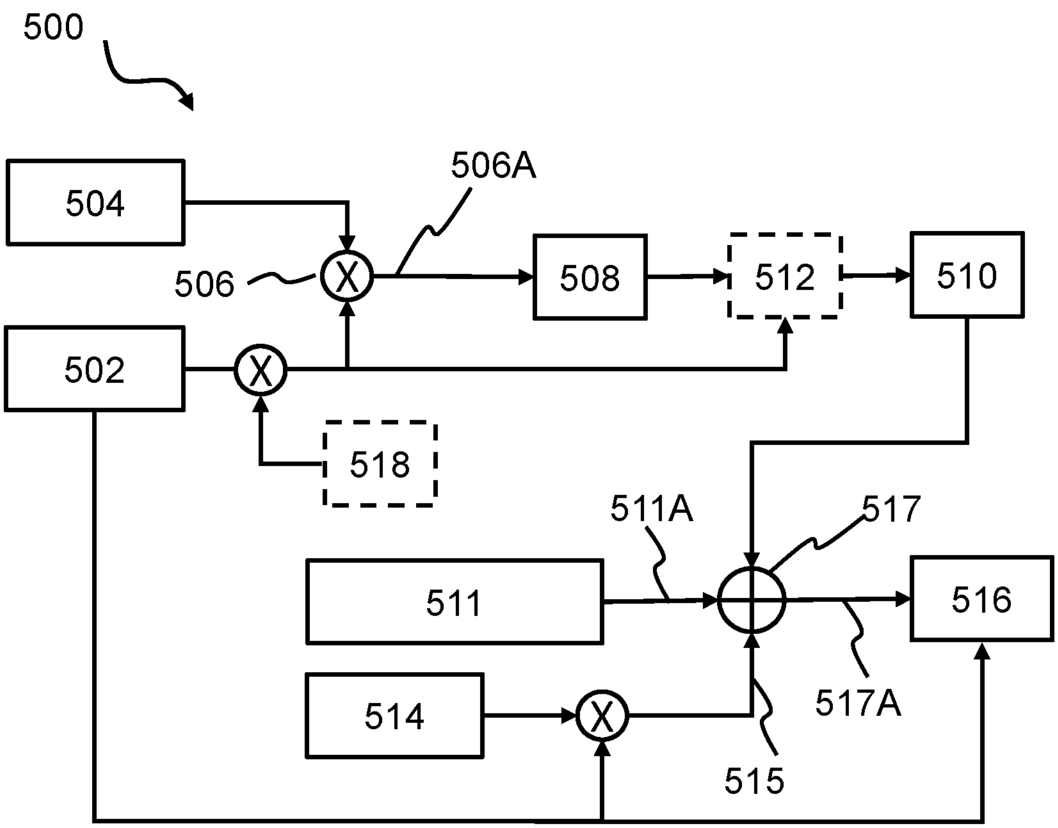

FIG. 5 shows an example block diagram of training data module for training set generation to train the extraction model, e.g. extraction model 310.

The training data module 500 comprises or is configured to obtain/receive a clean speech dataset 502 comprising clean speech signals. The clean speech dataset 502 may be obtained from the memory of an electronic device or a database.

The training data module 500 comprises or is configured to receive room impulse response (RIR) data 504. The RIR data 504 may be obtained from the memory of an electronic device or a database. The room impulse response (RIR) data 504 may be used for simulating a large number of audio signals for training the ML/NN. Thereby, the need for real recordings to train the deep neural networks is alleviated.

The training data module 500 comprises convolution module 506 configured to generate a set 506A of reverberant speech signals based on random draws of clean speech signals from clean speech dataset 502 and random draws from RIR data 504 by convolving clean speech signals and RIRs. The set 506A of reverberant speech signals are fed to a jammer function 508 for generating jammer data 510/jammer speech signals/far-filed speaker signals based on the set 506A of reverberant speech signals, e.g. via optional normalization module 512 based on the clean speech signals. The training data module 500 may comprise a database 518. The database 518 may comprise one or more audio device transfer functions. The training data module 500 may be configured to convolve one or more clean speech signal from the clean speech dataset 502 with one or more audio device transfer functions from the database 518, for provision of the set 506A.

The training data module 500 is configured to obtain/receive noise signals 511A by random draws from a noise dataset 511.

The training data module 500 is configured to generate user data/first speaker data/near speaker data or signals 515 by applying an audio device transfer function from transfer function dataset 514 to clean speech signal in convolution module 516 obtain/receive noise signals 511A by random draws from a noise dataset 511. The transfer function dataset 514 may be denoted a transfer function database or implemented in a database. The transfer function dataset 514 may be included in or form a common database with the database 518.

The training data module 500 may comprise a transfer function dataset 514. The training data module 500 may be configured to convolve one or more clean speech signal from the clean speech dataset 502 with one or more transfer functions from the transfer function dataset 514 for provision of user speech signals 515.

The training data module comprises a super positioning module 517 having jammer speech signals 510, noise signals 511A, and user speech signals 515 as input and configured to combine the jammer speech signals 510, noise signals 511A, and user speech signals 515 for provision of training signals 517A to training set 516. Further, the clean speech signal used for generating user data 515 is optionally added as reference signal to the training set 516.

The training set 516 may be used to train the extraction model, such as extraction model 310 of FIG. 1, and FIG. 4 to extract a near speaker component in a microphone input signal.

Examples of audio system comprising an audio device according to the disclosure is set out in the following items:

Item 1. A method for speech extraction in an audio device, wherein the method comprises:
- obtaining a microphone input signal from one or more microphones including a first microphone;
- applying an extraction model to the microphone input signal for provision of an output;
- extracting a near speaker component in the microphone input signal according to the output of the extraction model being a machine-learning model for provision of a speaker output; and
- outputting the speaker output.

Item 2. Method according to item 1, wherein the method comprises:
- determining a near speaker signal based on the near speaker component, and
- outputting the near speaker signal as the speaker output.

Item 3. Method according to any of the preceding items, wherein extracting a near speaker component in the microphone input signal comprises:
- determining one or more mask parameters including a first mask parameter based on the output of the extraction model.

Item 4. Method according to any of the previous items, wherein the machining learning model is an off-line trained neural network.

Item 5. Method according to any of the previous items, wherein the extraction model comprises deep neural network.

Item 6. Method according to any of the previous items, wherein obtaining a microphone input signal comprises performing short-time Fourier transformation on a microphone signal from one or more microphones for provision of the microphone input signal.

Item 7. Method according to any of the previous items, wherein the method comprises performing inverse short-time Fourier transformation on the speaker output for provision of an electrical output signal.

Item 8. Method according to any of the previous items, wherein the method comprises extracting a far speaker component in the microphone input signal according to the output of the extraction model.

Item 9. Method according to any of the previous items, wherein the method comprises extracting an ambient noise component in the microphone input signal according to the output of the extraction model.

Item 10. Method according to any of the previous items, wherein obtaining the microphone input signal from one or more microphones including a first microphone comprises obtaining one or more of a first microphone input signal, a second microphone input signal, and a combined microphone input signal based on the first microphone input signal and second microphone input signal, wherein the microphone input signal is based on one or more of the first microphone input signal, the second microphone input signal, and the combined microphone input signal.

Item 11. An audio device comprising a processor, an interface, a memory, and one or more transducers, wherein the audio device is configured to perform any of the methods 1-10.

Item 12. A computer-implemented method for training an extraction model for speech extraction in an audio device, wherein the method comprises:

obtaining clean speech signals;

obtaining room impulse response data indicative of room impulse response signals;

generating a set of reverberant speech signals based on the clean speech signals and the room impulse response data;

generating a training set of speech signals based on the clean speech signals and the set of reverberant speech signals; and training the extraction model based on the training set of speech signals.

Item 13. Method according to item 12, wherein generating the set of reverberant speech signals comprises convolving the room impulse response data with clean speech signals for provision of the set of reverberant speech signals.

Item 14. Method according to any one of items 12-13, wherein generating the training set of speech signal comprises:

normalizing the reverberant speech signals based on the clean speech signals.

Item 15. Method according to any one of items 12-14, wherein generating the training set of speech signals comprises obtaining noise signals, and wherein generating a training set of speech signals is based on the noise signals.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-5 comprise some modules or operations which are illustrated with a solid line and some modules or operations which are illustrated with a dashed line. The modules or operations which are comprised in a solid line are modules or operations which are comprised in a broad example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1 scenario
2 speaker/user 4 audio signal
6 sound reflecting object
20 noise source
22 noise signal
24 noise echo
30 interfering speaker
32 interfering audio signal
34 interfering echo
36 speaker output
40 wireless output signal
300, 300A audio device
301 memory
302 processor
303 interfaces
304 first microphone
304A first microphone input signal
306 loudspeaker
308 wireless communication module
310 extraction model
350 short-time Fourier transformation, SIFT, module
352 power normalizing module
354 extraction model module
360 first feed forward layer
362 first gated recurrent unit
364 second gated recurrent unit
368 second feed forward layer
370 third feed forward layer
372 output layer
372A output of extraction model
374 mask module
374A output of one or more mask parameters
376 extraction module
378 inverse short-time Fourier transformation, iSTFT, module
400 electronic device
500 training data module
502 clean speech dataset with clean speech signals
504 room impulse response data
506 convolution module
508 jammer function
510 jammer data/jammer speech signals
511 noise dataset
511A noise signal
512 normalization module
514 transfer function dataset
515 user data
516 training set of speech signals
517 super positioning module
517A training signals
518 database of audio device transfer functions
S102 obtaining a microphone input signal from one or more microphones including a first microphone
S102A obtaining one or more of a first microphone input signal, a second microphone input signal, and a combined microphone input signal
S102B performing short-time Fourier transformation on a microphone signal from one or more microphones for provision of the microphone input signal
S104 applying an extraction model to the microphone input signal for provision of an output
S106 extracting a near speaker component in the microphone input signal according to the output of the extraction model
S106A
S108 determining a near speaker signal based on the near speaker component
S110 extracting a far speaker component in the microphone input signal according to the output of the extraction model
S112 extracting an ambient noise component in the microphone input signal according to the output of the extraction model
S114 outputting the near speaker signal as the speaker output
S116 outputting the speaker output
S116A determining one or more mask parameters including a first mask parameter based on the output of the extraction model
S118 performing inverse short-time Fourier transformation on the speaker output
S202 comprises obtaining clean speech signals
S204 obtaining room impulse response data indicative of room impulse response signals
S206 generating a set of reverberant speech signals based on the clean speech signals and the room impulse response data
S206A convolving the room impulse response data with clean speech signals for provision of the set of reverberant speech signals
S208 generating a training set of speech signals based on the clean speech signals and the set of reverberant speech signals
S208A normalizing the reverberant speech signals based on the clean speech signals
S208B obtaining noise signals
S210 training the extraction model based on the training set of speech signals

The invention claimed is:

1. A method for speech extraction in an audio device, the method comprising obtaining input signal from one or more microphones including a first microphone;

performing a short-time Fourier transformation on the input signal to obtain a frequency domain representation of the input signal;

performing a power normalizing on the frequency domain representation of the input signal to obtain a power normalized input signal;

feeding the power normalized input signal into an extraction model, wherein the extraction model is a machine-learning model; and wherein the extraction model is trained based on clean speech signals and a set of reverberant speech signals;

determining one or more mask parameters based on output of the extraction model, wherein the one or more mask parameters comprise first mask parameters and second mask parameters;

extract a near speaker component based on the first mask parameters;

extract a far speaker component based on the second mask parameters;

wherein the far speaker component originates from a far speaker at a distance larger than approximately 30 cm from the first microphone, and the near speaker component originates from a near speaker at a distance less than approximately 30 cm from the first microphone.

2. The method according to claim 1, the method further comprising:

determining a near speaker signal based on the near speaker component, and outputting the near speaker signal as a speaker output.

3. The method according to claim 2, wherein the method further comprising performing inverse short-time Fourier transformation on the speaker output for provision of an electrical output signal.

4. The method according to claim 1, wherein the extracting of the near speaker component in the input signal comprises:

determining one or more mask parameters including a first mask parameter based on the output of the extraction model.

5. The method according to claim 1, wherein the machine-learning model is an off-line trained neural network.

6. The method according to claim 1, wherein the extraction model comprises deep neural network.

7. The method according to claim 1, wherein the obtaining of the input signal comprises performing short-time Fourier transformation on the input signal from one or more microphones for provision of the input signal.

8. The method according to claim 1, wherein the method further comprising extracting an ambient noise component in the input signal according to the output of the extraction model.

9. The method according to claim 1, wherein the obtaining of the input signal from one or more microphones including the first microphone comprises obtaining one or more of a first microphone input signal, a second microphone input signal, and a combined microphone input signal based on the first microphone input signal and second microphone input signal, wherein the input signal is based on one or more of the first microphone input signal, the second microphone input signal, and the combined microphone input signal.

10. An audio device comprising a processor, an interface, a memory, and one or more transducers, wherein the audio device is configured to perform the method according to claim 1.

* * * * *